United States Patent
Elkhazin

(10) Patent No.: US 11,330,258 B1
(45) Date of Patent: May 10, 2022

(54) METHOD AND SYSTEM TO ENHANCE VIDEO QUALITY IN COMPRESSED VIDEO BY MANIPULATING BIT USAGE

(71) Applicant: Xilinx, Inc., San Jose, CA (US)

(72) Inventor: Akrum Elkhazin, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/880,745

(22) Filed: May 21, 2020

Related U.S. Application Data

(60) Provisional application No. 62/851,006, filed on May 21, 2019.

(51) Int. Cl.
    *H04N 7/12*      (2006.01)
    *H04N 19/115*    (2014.01)
    *H04N 19/176*    (2014.01)
    *H04N 19/122*    (2014.01)
    *H04N 19/146*    (2014.01)

(52) U.S. Cl.
    CPC ......... *H04N 19/115* (2014.11); *H04N 19/122* (2014.11); *H04N 19/146* (2014.11); *H04N 19/176* (2014.11)

(58) Field of Classification Search
    CPC .. H04N 19/115; H04N 19/122; H04N 19/146; H04N 19/176
    USPC ..................................................... 375/240.02
    See application file for complete search history.

(56) References Cited

U.S. PATENT DOCUMENTS

| | | | | |
|---|---|---|---|---|
| 5,815,606 A | * | 9/1998 | Baker | G06K 9/38 358/3.14 |
| 6,633,609 B1 | * | 10/2003 | Ing | H04N 19/176 375/240.02 |
| 10,341,670 B1 | * | 7/2019 | Brailovskiy | H04N 19/192 |
| 2007/0047652 A1 | * | 3/2007 | Maruyama | H04N 19/521 375/240.16 |
| 2010/0196586 A1 | * | 8/2010 | Armand | A23K 20/158 426/648 |
| 2011/0299589 A1 | * | 12/2011 | Zhou | H04N 21/2402 375/240.02 |
| 2014/0241421 A1 | * | 8/2014 | Orton-Jay | H04N 19/124 375/240.03 |
| 2016/0029020 A1 | * | 1/2016 | Eymery | H04N 19/142 382/251 |

* cited by examiner

*Primary Examiner* — Gims S Philippe
(74) *Attorney, Agent, or Firm* — Goodwin Procter LLP

(57) ABSTRACT

Methods and systems for adjusting bit usage during encoding of the image blocks of a picture or a frame are disclosed. According to one embodiment, a method is provided for adjusting bit usage in video compression. The method includes obtaining an estimated bit or byte size of an image block of a video frame, and determining whether the estimated size is less than a first selected threshold. An adjustment to a quantization parameter (QP) is selected based on the determination, so that the actual bit/byte size of the block may be adjusted according to a target size.

12 Claims, 5 Drawing Sheets

(PRIOR ART)

100

METHOD AND SYSTEM TO ENHANCE VIDEO QUALITY IN COMPRESSED VIDEO BY MANIPULATING BIT USAGE

CROSS REFERENCE TO RELATED APPLICATIONS

This application claims priority to and the benefit of U.S. Provisional Patent Application No. 62/851,006, entitled "Method and System to Enhance Video Quality in Compressed Video by Establishing Lower Limit on Bit Usage per Block," filed on May 21, 2019, the entire contents of which are incorporated herein by reference.

FIELD

This disclosure generally relates to the encoding of images and video and, in particular, to methods and systems for enhancing video quality while maintaining a high compression ratio via bit-usage manipulation.

BACKGROUND

For the sake of convenience, digital images and videos are referred to in the discussion below as video. Raw video data tends to be very large (on the order of several megabytes, hundreds of megabytes, etc.) and, as such, video data is rarely transmitted and/or stored in the raw form. Rather, the video is encoded and compressed. Video compression generally involves transforming raw frames of video data into a bitstream that is typically orders of magnitude smaller in size than the original raw stream, measured in bits/bytes of data, while preserving an adequate representation of the original video. Such video compression is usually lossy, and is used ubiquitously both in the storage and transmission of video data.

Many modern video encoders begin by dividing each frame of raw data into a set of processing elements or blocks, and then process these blocks in a raster-scan order. In a typical encoding pipeline for the block-based hybrid encoding model (employed in various video coding standards such as H. 264, H. 265, VP9, etc.) every frame in the video typically undergoes the following operations:

Division of pixels of the frame into blocks;
Prediction (intra-frame and/or inter-frame);
Computation of residuals after prediction, and transformation thereof to the frequency domain;
Quantization of the transformed residual values using a quantization parameter (QP); and
Entropy encoding.

Such a pipeline is often implemented using a single hardware engine or a single thread of a software process. In the prediction step, the encoder makes a prediction about a part of a current block of the frame based on parts of the video that have previously been encoded, and that closely approximates the actual pixels in the current block. Then, a difference between the actual pixels of the current block and the prediction thereof is generated, and the difference (also called an error), is encoded to obtain a compressed bitstream.

The encoders take advantage of the spatial and/or temporal redundancy typically present in video data. In general, the video information does not tend to change rapidly from frame to frame, or from pixel to pixel within a frame. Therefore, it is usually possible to find a very good prediction for the current block based on parts of the video that have been processed previously. If the prediction is good, the difference between the actual and predicted blocks (i.e., the error) can be small and, as such, the error can be represented (encoded) using much less data (in terms of bits or bytes) than that needed for encoding the actual pixel values in a block, which allows for effective compression of the video data.

Two forms of prediction are used in HEVC, VP9, and other similar encoders. The first is called inter-frame prediction, which involves looking for matching pixels in a previously encoded frame. The term motion vector (MV) describes the offset between a region to be encoded in a current frame and a corresponding region in a previously encoded frame. The second prediction method is called intra-frame prediction, which involves looking for matching pixels by projecting the values of the neighboring pixels of a current block to derive the predicted pixel values for the current block.

SUMMARY

Methods and systems for dynamically adjusting bit usage in encoding, so that perception quality of the reconstructed video can be improved without minimizing the compression efficiency of the encoding scheme substantially are disclosed. According to one embodiment, a method is provided for adjusting bit usage in video compression. The method includes obtaining an estimated bit or byte size of an image block of a video frame, and determining whether the estimated size is less than a first selected threshold. An adjustment to a quantization parameter (QP) is selected based on the determination, so that the actual bit/byte size of the block may be adjusted according to a target size.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

Various embodiments described herein will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

Figure 1:
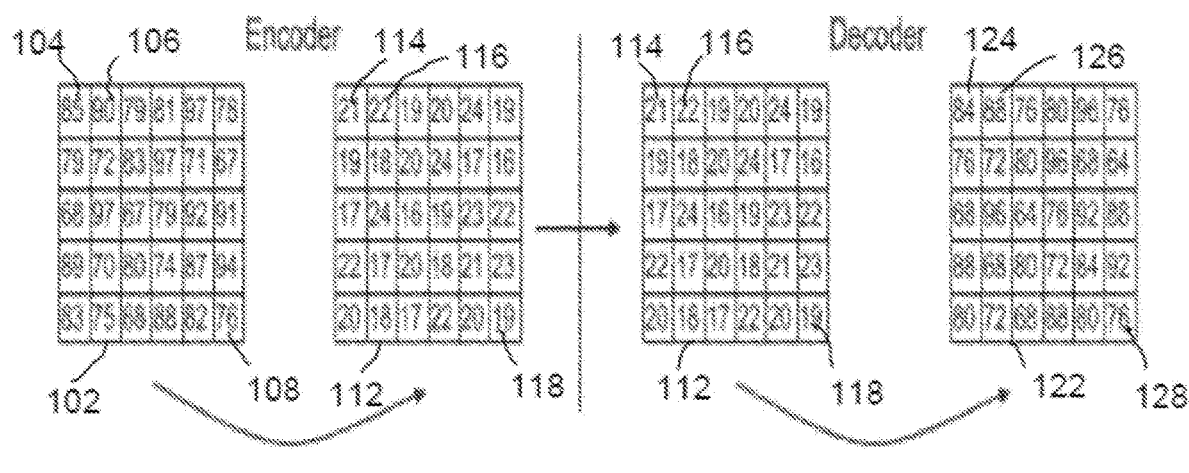
FIG. 1. illustrates an example quantization of pixel values and reconstruction of quantized pixel values.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The following disclosure provides different embodiments, or examples, for implementing different features of the subject matter. Specific examples of components and arrangements are described below to simplify the present disclosure. These are, of course, merely examples and are not intended to be limiting.

In lossy video compression, quantization is generally understood as the process of representing data that may take on a large range of values using a smaller set of values. The quantization process can be mathematically represented as a division operator, where an input unquantized value is divided by a number greater than one that is often referred to as a quant. At the decoder, an estimate of the original signal can be produced in a dequantization process by multiplying the quantized value by the quant. Large quant values reduce the range of the quantized data, thus requiring only a few bits to encode such data, but this may lead to a less accurate representation of the original video in the reconstructed video. On the other hand, a small quant value generally requires more bits to encode, and decreases the compression ratio.

FIG. 1 illustrates the quantization of pixel values in an encoder and recovery of encoded pixel values in a decoder. In this context, the pixel values can be coefficients, i.e., the transformed residuals generated during the processing of a block in an encoding pipeline. In particular, in one example, a quantized factor (e.g., quant value) of 4 is chosen. During encoding, in an original block 102, the original value 85 of pixel 104 is converted into a quantized value 21 for pixel 114 shown in the quantized block 112. This conversion is performed as the floor of the division 85/4. Similarly, the original value 90 of pixel 106 is converted into a quantized value 22 for the pixel 116 (according to the floor of 90/4), and the original value 76 of pixel 108 is converted into a quantized value 19 for the pixel 118 (according to the floor of 76/4). Likewise, all other pixel values in the original block 102 are converted into corresponding quantized values in the quantized block 112.

During decoding, using the quant (i.e., 4, in this example) the quantized block 112 is converted into a reconstructed block 122. For instance, each of the quantized values 21 (pixel 114), 22 (pixel 116), and 19 (pixel 118) is multiplied by the quant value of 4 to obtain reconstructed pixel values 84 (for pixel 124), 88 (for pixel 126), and 76 (for pixel 128), respectively. In a similar manner, all other pixel values in the quantized block 112 are converted into corresponding reconstructed values in the reconstructed block 122. The reconstruction error can be determined by comparing the corresponding pixel values. For example, the original value of pixel 104 is 85 while the reconstructed value, as represented by the reconstructed pixel 124, is 84.

In many modern video compression standards such as MPEG2, H264, HEVC, VP9, AV1, etc., not a single but several different quant values are considered, to tradeoff video reconstruction quality and compression ratio. Typically, several possible quant values in a set are indexed in the increasing order and the index of a particular quant value is referred to as a quantization parameter (QP) or quantization index. The QP is usually specified at a picture or a frame level, but it can also be specified at a block level using a delta QP parameter.

When all bocks are encoded with the same QP, the bit usage for a particular block may not correlate with the perceived level of distortion in the reconstruction of that block. As such, in some cases, adaptive quantization (AQ) is employed. AQ refers to the process of varying the QP parameter for different blocks within the same picture/frame in order to improve the perception quality of the reconstructed video.

Two types of adaptive quantization techniques, namely, spatial and temporal, may be used. Spatial AQ relies on an analysis of pixels within a single frame, and temporal AQ relies on an analysis of pixels from previous and/or future frames. Spatial AQ generally increases the QP for textured blocks and decreases the QP for flat blocks, to balance visual quality and the number of bits required for encoding. Temporal AQ can increase the visual quality by decreasing the QP for temporally predictable blocks, since a high quality reconstruction of a predictable block can be achieved using fewer bits than that of a temporally unpredictable block.

Typically a base QP for a frame (denoted base QP or frame QP) is established for the picture/frame, and for one or more blocks in the frame, a delta QP, representing the difference in the QP for that particular block relative to the base QP, is provided. Suppose a particular encoding/decoding scheme or standard uses N different quant values, where N can be 8, 16, 50, 64, 200, 256, etc. The different values may be indexed by the quantization parameter (QP), which ranges from [0,N−1] or from [1,N].

Typically, the quant values corresponding to the indices, i.e., the QPs, increase with the QP. For example, for QP=0 the quant value may be 4; for QP=1 and QP=2 the quant value may be 8; for QP=4 the quant value may be 10; for QP=12 the quant value may be 17; for QP=200 the quant value may 335; and so on. Thus, when the QP value is decremented, the value of the quant to be used for quantization may also decrease. Thus, in the foregoing example, if the base QP is 12, and delta QP is −8, the value of QP (given by base QP+delta QP) would be adjusted to 4=12+(−8) and, accordingly, the quant would change from 17 to 10.

A number of variables and/or parameters may be used to determine the delta QP. These variables and parameters may include measures of spatial texture, temporal predictability, predefined regions of interest (ROI), human face classification, skin tone classification, local illumination levels, the color space and gamut of the encoded video, special handling for high dynamic range (HDR) video, etc. In general, an AQ system produces a delta QP for a block based on a number of input variables and/or parameters. The delta QP for a block can be formed as a sum of individual delta QP components. The relationship between the delta QP for a block and the input variables and/or parameters may be complex and/or non-linear in nature.

Figure 2:
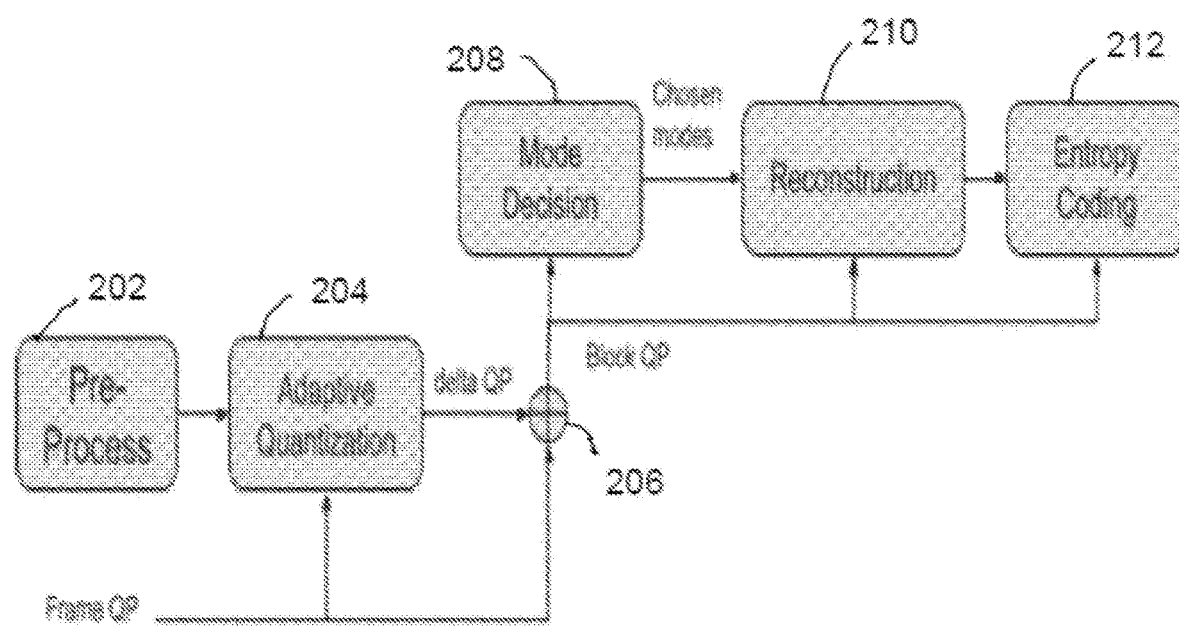
FIG. 2 schematically depicts a conventional image processing pipeline that features block-level quantization.

FIG. 2 illustrates the interaction between an AQ sub system and the other components in a video encoding system 200. During the encoding of the blocks of a frame, pre-processing operations, such as partitioning a frame into several image blocks, are performed in the pre-processing module 202, and a pre-processed image block is provided to an adaptive quantization (AQ) module 204. The AQ module 204 receives the frame QP (also called base QP) for the frame and, using pre-processing statistics and/or one or more variables and/or parameters, such as those described above, computes a delta QP for the image block to be encoded. The summation module 206 computes the block QP as an algebraic sum of the frame QP and the delta QP.

The mode decision module 208 determines whether inter-frame or intra-frame prediction is to be performed for the image block, and may also compute motion vectors. Using the selected mode, residual computation and time-domain to frequency-domain transformation of the residual are performed in the reconstruction module 210. Thereafter, the transformed residuals, also called coefficients, are quantized using the block QP provided by the summation module 206. The quantized coefficients are entropy encoded and transmitted by the entropy coding module 212. The entropy coding module may also encode the parameter delta QP, where the encoded delta QP is included in the transmitted bitstream.

During encoding, a reconstructed image block may be generated in the reconstruction module 210 using the quantized residuals and the block QP. The reconstructed image block may be compared with the original image block to obtain a reconstruction error. One or more parameters of the encoding process, including the frame QP, may be adjusted to minimize the error in the encoding of subsequent blocks and frames. In some embodiments, the residual computation and transformation operations may be performed in one or more different modules and not in the reconstruction module 210.

While the techniques described above can be used to adjust the QP and, in effect, quantization, at the block level, further optimization of the block level QP is possible. In particular, some embodiments described herein can adjust the block level QP by taking into account the estimated block size (in terms of number of bits or bytes) and the estimated frame size (also in terms of bits or bytes). In the discussion herein, size of a block/frame generally refers to the number of bits/bytes in the block/frame upon entropy encoding thereof. In general, the sizes of different encoded blocks in an encoded frame are expected to correlate with the number of pixels in the block as a fraction of the number of pixels in the frame.

Thus, based on the ratio of the number of pixels in a block and the number of pixels in a frame containing the block, a budgeted or allowable size for the block can be computed. If the estimated size of an encoded block is less than the budgeted or allowable size for that block, the block can be manipulated prior to its entropy encoding such that the entropy encoded manipulated block would have more bits/bytes, but the budgeted/allocated size for that block is not exceeded. Having the additional bits/bytes can be beneficial as it can improve the perception quality of the reconstructed image containing the encoded block, but without exceeding the budgeted or allowable size for the frame and the transmitted bitstream. Thus, the compression efficiency of the overall encoding scheme is not decreased substantially (e.g., by more than 1%, 2%, 5%, 10%, 12%, 20%, etc.).

As such, in various embodiments, prior to entropy encoding of a block, the coefficients of a block for which the estimated block size upon entropy encoding of the block is less than a budgeted/allowable size can be quantized at a higher resolution, i.e., using a smaller block QP, which corresponds to a smaller quant. The higher resolution quantization increases the size of the block upon entropy encoding thereof but can also minimize the reconstruction error and can increase the perception quality of the overall reconstructed image having that block. The decrease in the block QP is controlled such that the size of the block upon entropy encoding thereof does not exceed the budgeted/allowable block size.

Some embodiments establish a lower limit on the size of a block, where the lower limit is specified using a selected threshold size. In one embodiment, the threshold size is calculated using a selectable, specified fraction (e.g., 1%, 3%, 5%, 16%, etc.) as:

$$\text{threshold size} = \underset{\text{fraction}}{\text{a specified}} \times \underset{\text{frame size}}{\text{the estimated}} \times \frac{\text{the number of pixels in the block}}{\text{the number of pixels in the frame}}$$

Other methods of determining the threshold size are also contemplated. In general, the size of a block/frame refers to the size of the block/frame in bits or bytes upon entropy encoding thereof. If the estimated size of the block is less than the selected threshold size, an additional negative delta QP is applied to the block QP, which can increase the size of the block so that it is at least equal to the lower limit. In general, the smaller the selected fraction (and, as such, the smaller the selected threshold size), the greater the additional negative delta QP in magnitude.

The rationale for this strategy is that a block whose size is less than a target size may introduce visual artifacts or may not preserve fine details in the portion of the original image corresponding to that block. Because this block has a smaller estimated size than the budgeted or allowable size, decreasing the QP for this blocks may not significantly increase (e.g., more than 1%, 2%, 5%, 12%, 20%, 30%, etc.) the overall bit usage for the frame, but can increase the perception quality of the reconstructed image, thus providing an improved tradeoff between bit usage or compression efficiency and visual quality of the reconstructed image.

Figure 3:
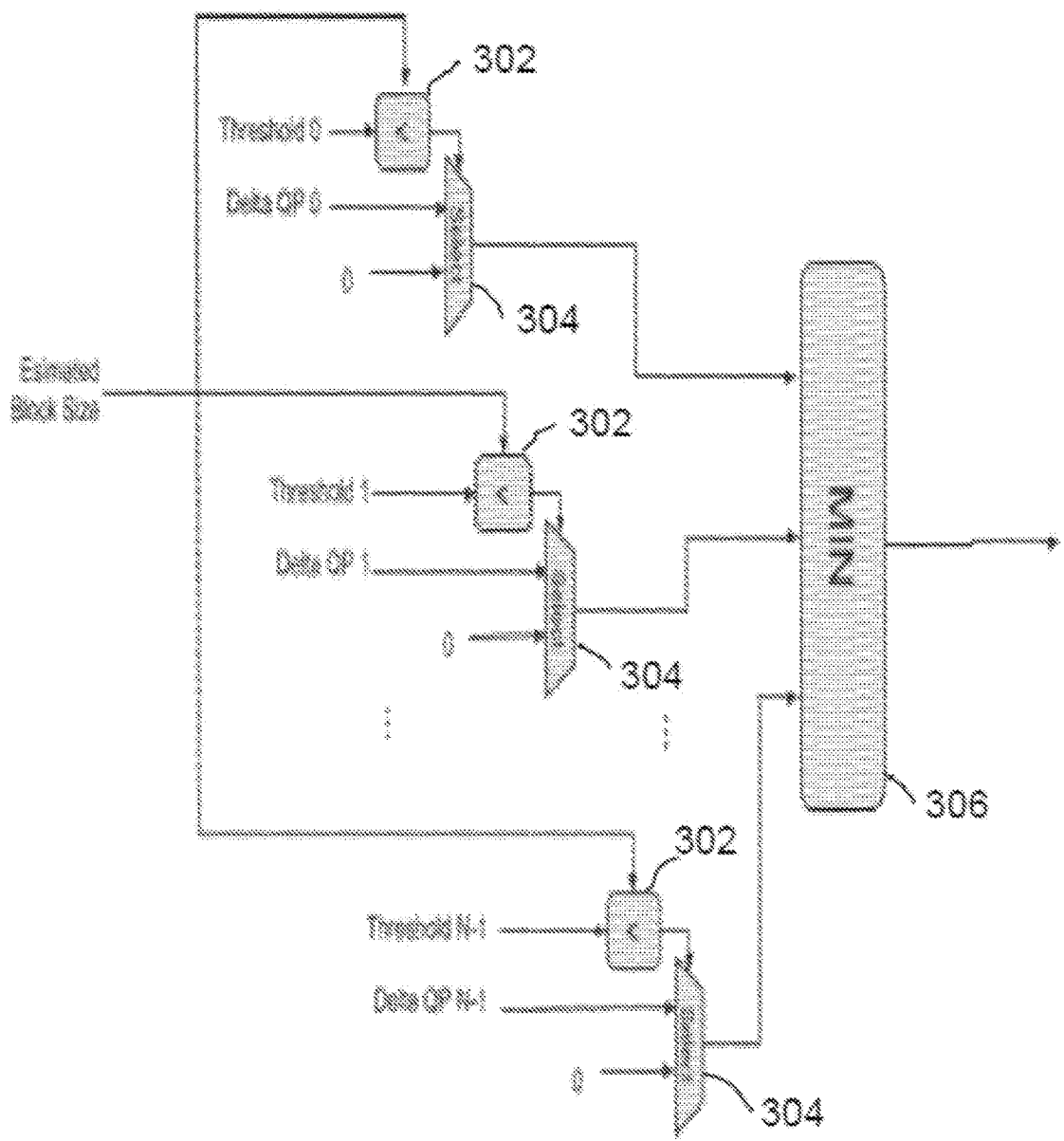
FIG. 3 depicts a process for providing a lower bound on a bit or byte size of an encoded image block, according to various embodiments.

In some embodiments, not just one, but several different lower limits that are defined by several different specified thresholds (or sub-thresholds) can be explored. FIG. 3 illustrates selection of the delta QP based on a number of sub-thresholds. With reference to FIG. 3, in some embodiments a set of N sub-thresholds, denoted {Threshold_0, Threshold_1, . . . , Threshold_(N−1)} are calculated by using a set of scale factors (each of which is less than one), instead of using a single fraction to calculate a single threshold size. The number N can be any number such as 1, 2, 4, 10, etc. Each sub-threshold (Threshold_n) has associated therewith a corresponding negative delta QP (denoted Delta_QP_n), where n∈[0,N]. Generally, sub thresholds of increasing magnitude are mapped to negative delta QPs of decreasing magnitude.

In the process 300, in step 302, the estimated block size is compared with each of the N sub thresholds. If the estimated block size is less than the n-th threshold, the corresponding delta QP from the n-th branch is selected at step 304. Otherwise, in step 304, the output of the n-th branch where the estimated block size is greater than or equal to the n-th threshold is set to zero. In step 306, the minimum delta QP from the N branches is selected.

Effectively, these embodiments map the estimated block size to a range between Threshold_i and Threshold_(i+i), and then select the corresponding (i+1)-th negative delta QP. For example, consider a set of scale factors $\sigma_i \triangleq \{3\%, 6\%, 9\%, 12\%\}$, where i∈[0, 3] that map to a set of negative QPs {−6, −3, −2, −1}. Consider an image block B of size in pixels of $B_c \times B_r$ in a picture/frame F of size in pixels $F_c \times F_r$, where the size in bits/bytes of the frame F is $S_F$. In some cases, in the set of sub thresholds the i-th subthreshold may be given by:

$$\text{Threshold\_i} = \frac{\sigma_i}{100} \times \frac{B_c * B_r}{F_c * F_r} \times S_F$$

Typically, though not necessarily, the image blocks are square and have sizes in pixels as 8×8; 16×16; 64×64; etc. Frames typically have sizes in pixels such as 1280×720; 1920×1080; 3840×2160; etc.

In the foregoing example, suppose the block size in pixels is 16×16 and the frame size in pixels is 1280×720. Further suppose that $$\frac{16*16}{1280*720} \times S_F = 1,000.$$

For the scale factors {3%, 6%, 9%, 12%}, the sub thresholds would be 30, 60, 90, and 120, respectively. If the estimated size (in bits/bytes) of a block $S_B$ is 25, all of the branches in the process 300 provide their respective negative delta QPs, i.e., −6, −3, −2, and −1, and, in the selection step 306, the minimum of these, i.e., −6, would be selected. If, however, the estimated block size is 84, the branches corresponding to the sub-thresholds 30 and 60 provide "0," and the branches corresponding to the sub-thresholds 90 and 120 provide negative delta QPs of −2 and −1, respectively. In the selection step 306, the minimum of these (e.g., the negative delta QP of −2) is selected.

In first case, because the estimated size of the block B is very small compared to the second case, a small QP and, correspondingly, a small quant can be applied, allowing the block size after entropy coding to increase more than it would in the second case. This can improve the perception quality of the reconstructed image/video without increasing the overall bit usage for the frame or without decreasing the compression efficiency significantly (e.g., by 1%, 2%, 5%, 10%, 25%, etc.).

In some embodiments, only a single threshold size is used instead of several sub threshold sizes. In this case, the process 300 has only one branch that includes the comparison step 302 and the selection step 304. The estimated block size would be compared with the selected threshold size in step 302. In step 304, if the estimated block size is smaller than the selected threshold size, the corresponding negative delta QP is selected; otherwise, the value 0 is selected. In this case, the step 306, in which the minimum delta QP from the N branches is generally selected, is omitted, and the value provided in step 304 is used to adjust the block QP.

Figure 4:
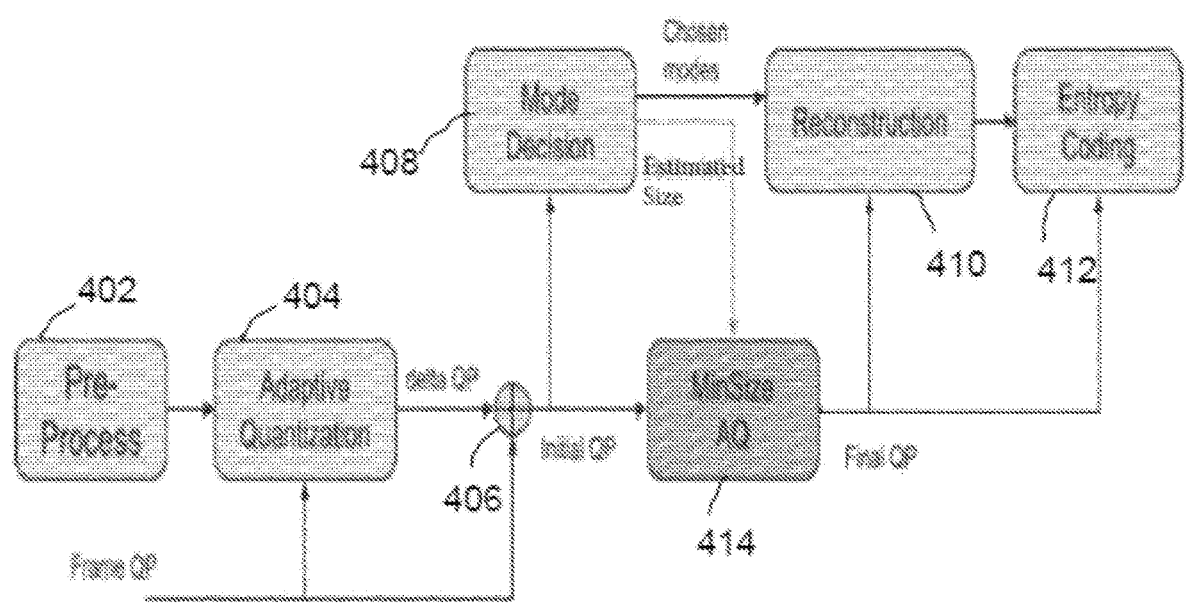
FIG. 4 schematically depicts an image processing pipeline featuring block-level quantization based on a lower bound on a bit or byte size of an encoded image block, according to various embodiments.

FIG. 4 schematically depicts a system that can implement various embodiments described herein. In the system 400, different modules perform different operations, and each of these modules can be implemented in hardware, software, or a combination of hardware and software. The adaptive quantization (AQ) module 404 receives the frame QP (also called base QP) for the frame to be encoded. Using pre-processing statistics and/or one or more variables and/or parameters of the selected encoding scheme or standard (e.g., MPEG2, H.264, HEVC, VP9, AV1, etc.), the AQ module 404 computes an initial delta QP for the image block to be encoded. The summation module 406 computes the initial block QP as an algebraic sum of the frame QP and the initial delta QP.

The mode decision module 408 chooses the best prediction mode and, using the initial delta QP, estimates the sizes in bits/bytes of a block of the frame and the frame for the chosen mode. The prediction modes include intra-block prediction or inter-block prediction, and a goal of either mode is to select a block similar to a block to be encoded, so that the residual or the difference between the identified similar block (generally referred to as the prediction block) and the block to be encoded is minimized. In intra-block mode, the prediction block may be selected using edge pixels of the top and left blocks that have already been coded using an intra mode such as horizontal mode, vertical mode or a diagonal mode that may closely follow underlying edge contours.

In inter-block mode, the prediction block is selected from a previous or a later frame. Selection of the best prediction mode generally includes selecting either the intra-prediction mode or the inter-prediction mode, and the associated intra mode or motion vectors that identify the selected prediction block. Selection of the best prediction mode may also include selection of other parameters of the selected mode, such as the block size, reference weights, etc., and selection of sub-modes. The best prediction mode may be selected according to a rate control algorithm and/or a rate-distortion parameter that can balance a desirable encoding rate with an acceptable level of distortion in reconstructed video.

Selection of the best prediction mode generally includes selecting either the intra-prediction mode or the inter-prediction mode, and the associated motion vectors that identify the selected prediction block. Selection of the best prediction mode may also include selection of other parameters of the selected mode, such as the block size, reference weights, etc., and selection of sub-modes. The best prediction mode may be selected according to a rate control algorithm and/or a rate-distortion parameter that can balance a desirable encoding rate with an acceptable level of distortion in reconstructed video.

The selected mode is passed to the reconstruction module 410, and the estimated sizes of the block and the frame are passed to the MinSize module 414. The MinSize module 414 produces the final block QP to be used in reconstruction by the reconstruction module 410. To this end, the MinSize module 414 may compute a further adjustment (generally a decrement) to be applied to the initial block QP, where the adjustment decrement can be computed according to various embodiments described above with reference to FIG. 3. In general, the final block QP is the algebraic sum of the initial block QP and the negative of the magnitude of the computed adjustment or decrement (also referred to as negative delta QP). The quantized coefficients produced by the reconstruction module are provided to the entropy encoding module 412.

In general, the reconstruction module 410 of FIG. 4 is similar to the reconstruction module 210 described above with reference to FIG. 2. Rather than using the block QP (or the initial block QP), however, the reconstruction module 410 uses the final block QP, which may have been decreased further, as described above. The use of the decreased QP would result in producing quantized coefficients for the block at a higher resolution than that would have been obtained using the initial block QP.

It should be understood that in FIG. 4, only some parts of a typical encoding pipeline are shown. Modules that perform other operations of the pipeline, such as intra prediction, motion estimation, rate control, etc. are not shown merely for the sake of clarity. One of ordinary skill in the art would appreciate and understand that these additional operations would be performed, as needed, using the modules shown in FIG. 4 and/or other modules, during the overall encoding process.

In some embodiments, the mode decision module 408 computes the estimated block/frame sizes assuming that all the blocks within the picture/frame would be encoded using intra-frame prediction only, even though the chosen modes that are used in the reconstruction may include both intra-frame and inter-frame predictions. In other embodiments, the mode decision module 408 computes the estimated block/frame sizes assuming that the blocks within the picture/frame would be encoded using both intra-frame and inter-frame prediction, even though the chosen modes that are used in reconstruction may include intra-frame predictions only.

Figure 5:
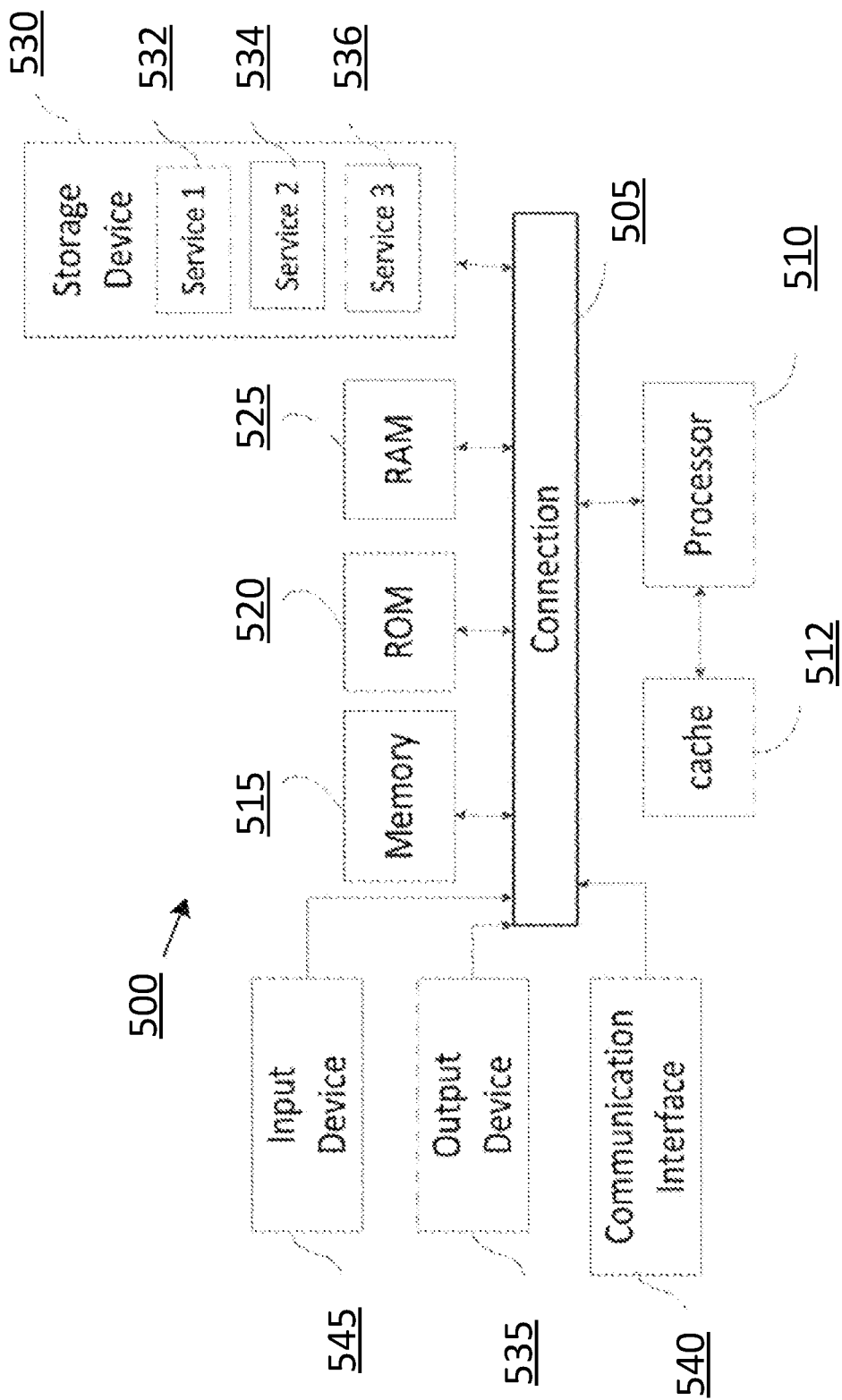
FIG. 5 illustrates an exemplary computing system, according to one embodiment.

FIG. 5 illustrates an exemplary computing system 500 in which the components of the system are in communication with each other using connection 505. Computing system 500 can be, for example, a computing system of a server, PC, tablet and/or mobile device, in which a processor, field programmable gate array (FPGA), or other programmable processing device performs the processes described above. While these devices have some components in common, such as those exemplified above, it should be appreciated that each of the server, PC, tablet and/or mobile device are specialized devices configured for their specific purposes. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Exemplary computing system 500 includes at least one processing unit (CPU, FPGA, or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMS), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory or transitory computer-readable medium.

In some embodiments the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for adjusting bit usage in video compression, the method comprising:
    obtaining an estimated size of an image block of a video frame, the estimated size being represented as a bit size or a byte size;
    computing a plurality of thresholds, wherein computing a particular one of the plurality of thresholds comprises computing a product of: (i) a respective scaling factor, (ii) an estimated frame size, and (iii) a ratio of a pixel size of the image block and a pixel size of the video frame, wherein the respective scaling factors are selected in an increasing order and all scaling factors are greater than zero and less than one;
    designating, for each of the plurality of thresholds sorted in an increasing order, a corresponding adjustment to a quantization parameter (QP), the designated adjustments being sorted in a decreasing order;
    determining, for each threshold of the plurality of thresholds, whether the estimated size is less than the threshold;
    obtaining, for each threshold of the plurality of thresholds, a respective adjustment to the QP based on the determination whether the estimated size is less than the threshold; and
    selecting an adjustment to the QP by selecting a minimum from the obtained plurality of respective adjustments.

2. The method of claim 1, wherein:
    determining, for each of the plurality of thresholds, whether the estimated size is less than the threshold comprises determining whether the estimated size is less than a first selected threshold, and
    the method further comprising:
    selecting the first selected threshold based on:
        the estimated frame size;
        the ratio of the pixel size of the image block and the pixel size of the video frame; and
        a first scaling factor, the first scaling factor being greater than zero and less than one.

3. The method of claim 2, wherein:
    determining whether the estimated size is less than the first selected threshold comprises determining that the estimated size is equal to or greater than the first selected threshold,
    the method further comprising determining that the estimated size is less than a second selected threshold; and
    selecting an adjustment corresponding to the second selected threshold to the QP based on the determination that that the estimated size is equal to or greater than the first selected threshold but less than a second selected threshold.

4. The method of claim 1, further comprising:
    decreasing the QP by magnitude of the selected adjustment.

5. The method of claim 4, further comprising:
    quantizing the image block according to the decreased QP; and
    entropy-encoding the quantized block and the decreased QP,
    wherein a standardized encoding process comprises the quantizing and entropy-encoding steps.

6. The method of claim 5, wherein:
    a pixel size of the image block is 4×4, 8×8, 16×16, 32×32, 64×64, or 128×128; and
    a pixel size of the video frame is 1280×720, 1920×1080, or 3840×2160.

7. A system for adjusting bit usage in video compression, comprising:
    a processor; and
    a memory in communication with the processor and comprising instructions which, when executed by the processor, program the processor to:
        obtain an estimated size of an image block of a video frame, the estimated size being represented as a bit size or a byte size;
        compute a plurality of thresholds, wherein a particular one of the plurality of thresholds is computed by computing a product of: (i) a respective scaling factor, (ii) an estimated frame size, and (iii) a ratio of a pixel size of the image block and a pixel size of the video frame, wherein the respective scaling factors are selected in an increasing order and all scaling factors are greater than zero and less than one;
        designate, for each of the plurality of thresholds sorted in an increasing order, a corresponding adjustment to a quantization parameter (QP), the designated adjustments being sorted in a decreasing order;

determine, for each threshold of the plurality of thresholds, whether the estimated size is less than the threshold;

obtain, for each threshold of the plurality of thresholds, a respective adjustment to the QP based on the determination whether the estimated size is less than the threshold; and select an adjustment to the QP by selecting a minimum from the obtained plurality of respective adjustments.

8. The system of claim 7, wherein, to determining, for each of the plurality of thresholds, whether the estimated size is less than the threshold, the instructions further program the processor to determine whether the estimated size is less than a first selected threshold, and the instructions further program the processor to:

select the first selected threshold based on:

the estimated frame size; and the ratio of the pixel size of the image block and the pixel size of the video frame; and a first scaling factor, the first scaling factor being greater than zero and less than one.

9. The system of claim 8, wherein:

to determine whether the estimated size is less than the first selected threshold, the instructions program the processor to determine that the estimated size is equal to or greater than the first selected threshold;

the instructions further program the processor to determine that the estimated size is less than a second selected threshold; and select an adjustment corresponding to the second selected threshold to the QP based on the determination that that the estimated size is equal to or greater than the first selected threshold but less than a second selected threshold.

10. The system of claim 7, wherein the instructions further program the processor to:

decrease the QP by magnitude of the selected adjustment.

11. The system of claim 10, wherein the instructions further program the processor to:

quantize the image block according to the decreased QP; and entropy-encode the quantized block and the decreased QP, wherein a standardized encoding process comprises the quantize and entropy-encode operations.

12. The system of claim 7, wherein:

a pixel size of the image block is 4×4, 8×8, 16×16, 32×32, 64×64, or 128×128; and a pixel size of the video frame is 1280×720, 1920×1080, or 3840×2160.

* * * * *